United States Patent Office
3,428,588
Patented Feb. 18, 1969

3,428,588
SALTS OF PARTIAL FATTY ESTERS OF CARBOXYLIC POLYMERS USEFUL IN AQUEOUS COATING COMPOSITIONS
Martin Skoultchi, New York, N.Y., and Joseph Fertig, Elizabeth, N.J., assignors to National Starch and Chemical Corporation, New York, N.Y., a corporation of Delaware
No Drawing. Filed Aug. 30, 1965, Ser. No. 483,818
U.S. Cl. 260—23        8 Claims
Int. Cl. C08f 27/12; C09d 3/74

ABSTRACT OF THE DISCLOSURE

A method for preparing air-drying, crosslinkable resin compositions and the compositions thus prepared, comprising the process of reacting a vinyl polymer containing anhydride groups within its molecule with an ester-alcohol derived from an unsaturated fatty acid.

---

This invention relates to a method for the preparation of water soluble, readily crosslinkable, resin compositions and, more particularly, to the novel resin compositions thus prepared.

Water soluble, crosslinkable resin compositions comprising the reaction products of polymeric alcohols with unsaturated fatty acids have heretofore been prepared, in most instances, through the use of a Diels-Alder type reaction with maleic anhydride. Such procedures, however, have the disadvantage of consuming part of the available unsaturation which is present in the fatty acid in order to provide the resulting reaction products with water soluble properties. Thus, since such resin compositions crosslink through reactions which occur at their unsaturated sites, there is a severe reduction in the crosslinking potential, and the properties dependent thereon, which is exhibited by the products prepared by means of these Diels-Alder reaction procedures.

Where attempts have been made to avoid the use of Diels-Alder systems in effecting the direct reaction between polyanhydrides and polyols, additional problems have arisen. Thus, the concentration of the anhydride moieties in the resins has been rather limited and strictly controlled in order to prevent the occurrence of softness or gellation in these products. Their anhydride content has also been limited in order to permit the reaction to proceed for a sufficient length of time inasmuch as a premature termination of such reactions would result in resins exhibiting high acid numbers and correspondingly poor compatibility characteristics. In addition, only low molecular weight anhydride copolymers have been found applicable to these reaction procedures because of the tendency of higher molecular weight copolymers to crosslink during the course of the reaction. Of more significance, however, is the fact that the resin products resulting from such techniques fail to exhibit the highly desirable property of solubility in water because of the insufficient number of carboxyl groups present therein.

Attempts have also been made to react polyacids or polyanhydrides with unsaturated fatty alcohols. However, the relative unavailability of such alcohols makes this type of process commercially unattractive.

Thus, it is the prime object of this invention to prepare air-drying, crosslinkable resin compositions characterized by their water solubility and their ability to crosslink on curing at ambient temperatures. It is a further object to provide a procedure for preparing such resin compositions which does not result in reducing the number of reactive double bonds which are present in the compositions. Various other objects and advantages of our invention will become apparent to the practitioner in the course of this disclosure.

The products of this invention comprise the novel, synthetic resins which are produced by means of condensation polymerization techniques resulting in compositions containing, as part of the molecule thereof, at least on mer, i.e., a repetitive chemical structural unit, corresponding to the following formula:

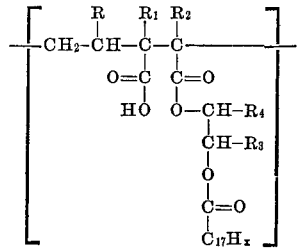

wherein R is a radical selected from the group consisting of hydrogen, phenyl, substituted phenyl, methoxy and acetoxy radicals; wherein $R_1$, $R_2$, $R_3$, and $R_4$ are radicals selected from the group consisting of hydrogen radicals and alkyl radicals; and, wherein $x$ is an integer having a value of from 27 to 33 inclusive.

In brief, the procedure for preparing the novel products of this invention comprises reacting a vinyl polymer containing anhydride groups within its molecule, with an ester-alcohol prepared from a polyunsaturated fatty acid or a mixture of such acids. The resulting resin compositions thus contain the water solubilizing carboxyl group as part of their vinyl polymer backbone and not as part of a side chain to which it has been affixed at the expense of reducing the number of double bonds in the fatty acid moiety of the polymers. The maintenance of these double bonds in the fatty acid moiety of our novel polymers renders the resulting compositions more active in terms of their ability to crosslink on drying in air.

The anhydride containing vinyl copolymers applicable for use in the process of this invention are those polymers containing at least one mer which corresponds to the formula:

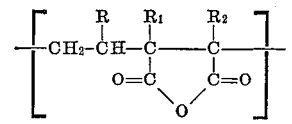

wherein R represents a radical selected from the group consisting of hydrogen, phenyl, substituted phenyl, methoxy, and acetoxy radicals; and, wherein $R_1$ and $R_2$ are radicals selected from the group consisting of hydrogen radicals and alkyl radicals. These anhydride containing vinyl copolymers are ordinarily commercially available or, if desired, they can be readily prepared by any one of the free radical polymerization techniques well known to those skilled in the art. The anhydride component of these vinyl copolymers may be derived from any ethylenically unsaturated anhydrides capable of undergoing free radical initiated polymerization reactions. Thus, although copolymers of maleic anhydride are preferred for use in the process of this invention, one may also employ copolymers of substituted maleic anhydrides, citraconic anhydride, and itaconic anhydride, etc. In all cases, however, the selected anhydride comonomers should constitute from about 5 to 50 mole percent of the resulting anhydride containing copolymer while the molecular weight of the latter copolymer should be in the range of from about 500 to 7000.

There is a wide choice with regard to the selection of the ethylenically unsaturated comonomers which may be copolymerized with the selected anhydride monomer.

Thus, one may employ any one or more of the following group of comonomers: styrene and substituted styrenes, such as vinyl toluene, chlorostyrene, and alphamethyl styrene; the acrylic and methacrylic acid esters of aliphatic alcohols, such as methyl, ethyl, propyl, butyl, isobutyl, amyl, hexyl, 2-ethyl hexyl, octyl, lauryl and stearyl alcohols; acrylic acids; methacrylic acids; acrylamide; methacrylamide; acrylonitrile; methacrylonitrile; butadiene-1,3 and chlorobutadiene-1,3; vinyl chloride; vinyl acetate, vinyl propionate, and other vinyl esters; vinyl alkyl ethers; vinylidene compounds, such as vinylidene chloride; isoprene; ethylene; propylene; and, tetrafluoroethylene.

The polyunsaturated fatty acids, from which the ester-alcohols used in the process of this invention are prepared, are derived from the hydrolysis of such drying oils as soya, safflower, linseed, dehydrated castor, tung, oiticica, etc. Thus, among the 18 carbon atom, unsaturated fatty acids applicable for use in the preparation of these ester-alcohols are oleic acid, linoleic acid, linolenic acid, eleostearic acid, licanic acid, and ricinoleic acid, etc. For purposes of this invention, no distinction is to be noted between fatty acids containing conjugated double bonds and those containing non-conjugated double bonds, although in actual use, conjugated systems are found to provide faster drying times in the resins resulting from the process of this invention. The ester-alcohols may be prepared by any of the reaction procedures well known to those skilled in the art for use in the preparation of such compounds. Thus, one may employ the technique involving the base catalyzed addition of an epoxide to the unsaturated acid or to a mixture of such unsaturated acids. Also applicable is the technique of partially esterifying a glycol with the fatty acid. Thus, the ester-alcohols of fatty acids applicable for use in the process of this invention correspond to the formula:

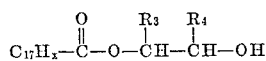

wherein $R_3$ and $R_4$ represent radicals selected from the group consisting of hydrogen radicals and alkyl radicals: and wherein $x$ is an integer having a value of from 27 to 33 inclusive. For purposes of brevity, the latter reagents will hereinafter be referred to as "ester-alcohols."

In addition, any aliphatic or aromatic monofunctional alcohols may be used, if desired, in amounts not exceeding about 15 mole percent of the total ester-alcohol content, in conjunction with the above cited ester-alcohols. Typical of such aliphatic alcohols are tetrahydrofurfuryl, octyl and lauryl alcohols, etc., which such aromatic alcohols may include benzyl alcohol and phenoxyethanol. These aliphatic and aromatic monofunctional alcohols are included in order to impart varied additional properties to the resulting resin compositions or the films derived therefrom. Thus, for example, benzyl or tetrahydrofurfuryl alcohols may be included to increase mar resistance and toughness in the crosslinked films derived from the resin compositions of this invention.

In more detail, now, the procedure for the preparation of the novel resins of this invention comprises the addition, under agitation, of the selected anhydride containing vinyl copolymer to the selected ester-alcohol. The reaction is conducted in an inert atmosphere, such as nitrogen or carbon dioxide, in order to prevent oxidation of the fatty acid unsaturation. The rate of addition of the anhydride copolymer is controlled so as to avoid having the reaction temperature fall below about 190° C. This insures rapid solution of the vinyl polymer while eliminating the tendency for it to agglomerate. The reaction then proceeds for a period of about ½ to 3 hours at a reaction temperature of from about 190 to 270° C. The resulting product may be filtered hot (approximately 140° C.) through any means equipped to fully remove all extraneous solid residue present therein. The resin compositions thus prepared should have a molecular weight in the range of from about 1000 to 8000 and an acidity of from about 0.53 to 2.70 milliequivalents per gram.

Although the reaction proceeds at a rapid rate without the use of catalysts, a hydrogen ion catalyzed system, such as that which results from the presence of mineral acids, may be used if desired. The use of solvents in the reaction is also unnecessary; however, if solvents are used, it is essential that they should be inert with respect to both the anhydride containing copolymers and the ester-alcohols. Thus, anhydrous solvents such, for example, as xylene and mineral spirits, etc. are applicable.

With respect to proportions, the ester-alcohol should be present in a concentration which is from about 20 to 120 mole percent of the available anhydride groups present in the anhydride containing vinyl copolymer.

It is necessary to have some free carboxyl groups present in the resulting resin compositions in order to attain the desired water solubility therein. Thus, complete esterification results in resins which are soluble in organic solvents, thereby nullifying the properties desired in the resin compositions of this invention.

The carboxyl groups present in the polymer chain of our novel resin products are ordinarily neutralized with a base in order to effect their solubilization by converting them into the form of a salt. The choice of neutralizing base to be utilized is left to the discretion of the practitioner, although such factors as volatility, economy, odor, and inertness to the polymer system, etc. must be considered. Among applicable bases are inorganic bases such as sodium, potassium, lithium and ammonium hydroxides, amines such as trimethyl, triethyl, and triisopropyl amine, and alkanolamines such as dimethylaminoethanol, triethanolamine, ethanolamine, diethanolamine, diethylaminoethanol, and triisopropanolamine, etc.

The films derived from the resin composition of this invention are hard, durable, and resistant to water and alkali. These beneficial properties result directly from the crosslinking of these novel resin compositions; the crosslinking having occurred at their unsaturated sites. In addition, these films show rapid drying characteristics at ambient temperatures.

The resin composition resulting from the process of this invention are found to be extremely stable and may be stored for prolonged periods with no danger of any premature curing or other spoilage. As previously noted, these resin compositions may be used in a variety of applications as coatings and binders.

The following examples will further illustrate the embodiment of this invention. In these examples all parts given are by weight unless otherwise noted.

Example I

This example illustrates the preparation of the novel resin compositions of this invention.

A reaction vessel fitted with a stirrer, thermometer, steam condenser and an inert gas sparge was evacuated and provided with a carbon dioxide atmosphere. Under agitation, the vessel was thereupon charged with 675 parts (2.0 moles) of the hydroxypropyl ester of safflower fatty acids and was then heated to 205° C. While stirring continued, 865 parts (2.1 moles) of a styrene-maleic anhydride copolymer containing 25 mole percent of maleic anhydride and having a molecular weight of 1900 was introduced at such a rate that the internal temperature of the system did not fall below 190° C. The now complete reaction mixture was then heated to 235–240° C. and, while under agitation, was maintained at the latter temperature for a period of one hour. The resulting product was then cooled to 140° C. over a period of 1½ hours, whereupon it was filtered hot through fine cheese cloth in order to remove any solid residue present therein. The resin composition thus obtained was in the form of a viscous oil and had a molecular weight in the order of 3700.

In order to determine the quantity of the desired carboxyl groups in the latter resin composition, its acidity was determined by titrating a benzene-methanol solution of the resin with alcoholic potassium hydroxide. The amount of acidity was thus calculated as 0.928 milliequivalents/gram.

Example II

This example illustrates both the water solubility and the crosslinking properties of the novel resin compositions of this invention.

A vessel containing 50 parts of the resin composition prepared in Example I, hereinabove, together with 10 parts of isopropanol and 10 parts of butyl Cellosolve was heated to 50° C. so as to thereby dissolve the resin. A solution containing 4.1 parts of dimethylaminoethanol in 30 parts of water was then added to neutralize the acidity of the resin by forming a salt therewith. The resulting clear, homogeneous solution was indicative of the tendency of the resin compositions to readily solubilize in aqueous media.

To the above prepared solution, 1.0 part of a water dispersable drier containing 24%, by weight, of lead and 0.5 part of a water dispersable drier containing 6%, by weight, of cobalt, were added. A 3 mil wet film of the resulting polymer solution was then cast on a glass plate. After air-drying for two days at ambient temperatures, the film was found to be impervious to attack from dilute alkali as well as from acetone and other common organic solvents. This extraordinary resistance to the latter materials is clearly indicative of a high degree of crosslinking on the part of the novel resins of this invention.

Example III

This example further illustrates the preparation of the novel resin compositions of this invention utilizing a variety of anhydride copolymers, and ester-alcohol combinations.

The formulations appearing in the table below were prepared by means of the procedure described in Example I, hereinabove.

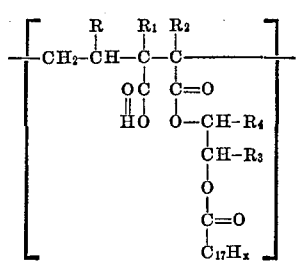

wherein R is a radical selected from the group consisting of hydrogen, phenyl, substituted phenyl, methoxy and acetoxy radicals; wherein $R_1$, $R_2$, $R_3$ and $R_4$ are radicals selected from the group consisting of hydrogen radicals and alkyl radicals; and, wherein $x$ is an integer having a value of from 27 to 33 inclusive; comprising reacting an anhydride containing vinyl copolymer having at least one mer corresponding to the formula

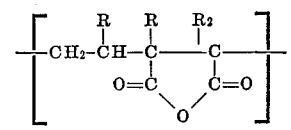

wherein R represents a radical selected from the group consisting of hydrogen, phenyl, substituted phenyl, methoxy and acetoxy radicals; and, wherein $R_1$ and $R_2$ are radicals selected from the group consisting of hydrogen radicals and alkyl radicals; and an ester-alcohol of at least one polyunsaturated fatty acid corresponding to the formula

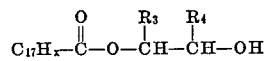

wherein $R_3$ and $R_4$ represent radicals selected from the group consisting of hydrogen radicals and alkyl radicals; and, wherein $x$ is an integer having a value of from 27 to 33 inclusive; said reaction being conducted at a temperature of from about 190° C. to 270° C. and for a period

| Anhydride Copolymer | | | Ester-alcohol | | Acidity of Resulting Comp. (Milliequivalents/gram) |
|---|---|---|---|---|---|
| Mole percent maleic anhydride | Comonomer | Parts copolymer | Hydroxy-propyl ester of fatty acids from— | Parts ester-alcohol | |
| 25 | Styrene | 865 | Soya oil | 675 | 0.910 |
| 25 | ___do___ | 865 | Linseed oil | 675 | 0.927 |
| 33 | ___do___ | 258 | Safflower oil | 270 | 0.921 |
| 33 | ___do___ | 258 | Dehydrated castor oil | 270 | 1.085 |
| 50 | ___do___ | 555 | Safflower oil | 675 | 1.835 |
| 50 | ___do___ | 485 | Soya oil | 675 | 0.843 |
| 50 | Ethylene | 302 | Dehydrated castor oil | 675 | 0.886 |
| 50 | Methyl vinyl ether | 374 | Safflower oil | 675 | 1.001 |
| 25 | Styrene | 244 | 85 mole percent safflower oil, 15 mole percent diallyl ether of trimethylol propane | 182.2 | 0.938 |
| 50 | ___do___ | 243 | 85 mole percent safflower oil, 15 mole percent benzoic acid | 337.6 | 0.808 |
| 50 | ___do___ | 139 | 85 mole percent safflower oil, 15 mole percent tetrahydrofurfuryl alcohol | 172.7 | 0.818 |

Utilizing the procedures described in Example II, hereinabove, each of the above prepared formulations was found to exhibit excellent solubilizing and crosslinking characteristics.

Summarizing, it is thus seen that this invention provides for the preparation of novel resin compositions characterized by their water solubility and ability to readily crosslink at ambient temperatures.

What is claimed is:

1. A method for the preparation of water soluble resin compositions containing, as part of the molecule thereof, at least one mer corresponding to the formula of from about ½ to 3 hours; wherein said anhydride containing vinyl copolymer contains from about 5 to 50 mole mole percent of an anhydride comonomer and has a molecular weight in the range of from about 500 to 7000; and, wherein the concentration of said ester-alcohol which is present in said reaction system is from about 20 to 120 mole percent of the available anhydride groups present in said anhydride containing vinyl copolymer.

2. The method of claim 1, wherein the reaction system also contains a monofunctional alcohol selected from the group consisting of aliphatic and aromatic alcohols; wherein said monofunctional alcohol is present in a concentration not exceeding about 15 mole percent of the total ester-alcohol content in said reaction system.

3. The method of claim 1, wherein said resin composition has a molecular weight in the range of from about 1000 to 8000.

4. The method of claim 1, wherein said resin composition has an acidity value of from about 0.53 to 2.70 milliequivalents per gram.

5. A water soluble resin composition containing, as part of the molecule thereof, at least one mer corresponding to the formula

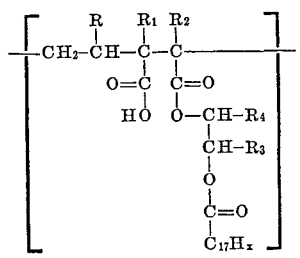

wherein R is a radical selected from the group consisting of hydrogen, phenyl, substituted phenyl, methoxy and acetoxy radicals; wherein $R_1$, $R_2$, $R_3$, and $R_4$ are radicals selected from the group consisting of hydrogen radicals and alkyl radicals; and, wherein $x$ is an integer having a value of from 27 to 33 inclusive.

6. The resin composition of claim 5, wherein its molecular weight is in the range of from about 1000 to 8000.

7. The resin composition of claim 5, wherein its acidity value is from about 0.53 to 2.70 milliequivalents per gram.

8. The resin composition of claim 5, wherein the carboxyl groups contained therein have been neutralized by reaction with a base selected from the group consisting of inorganic bases, amines and alkanolamines.

References Cited

UNITED STATES PATENTS

| | | | |
|---|---|---|---|
| 2,977,334 | 3/1961 | Zopf et al. | 260—27 |
| 2,997,464 | 8/1961 | Sellers | 260—78.5 |
| 3,085,986 | 4/1963 | Muskat | 260—31.8 |
| 3,085,994 | 4/1963 | Muskat | 260—78.5 |
| 3,098,834 | 7/1963 | Jerabek | 260—23.7 |
| 3,284,385 | 11/1966 | D'Alelio | 260—23 |
| 3,340,295 | 9/1967 | Wheeler et al. | 260—486 |
| 3,357,936 | 12/1967 | Zimmerman, et al. | 260—22 |
| 3,134,759 | 5/1964 | Kirkpatrick et al. | 260—97.5 |

DONALD E. CZAJA, *Primary Examiner.*

R. A. WHITE, *Assistant Examiner.*

U.S. Cl. X.R.

260—29.6, 33.2, 33.4, 78.5, 410.6